Aug. 25, 1964 J. C. NORTON 3,146,299
MINERAL INSULATED CABLE CONNECTOR
Filed July 5, 1962

INVENTOR.
JOSEPH C. NORTON
BY Maurice W. Ryan
ATTORNEY

United States Patent Office 3,146,299
Patented Aug. 25, 1964

3,146,299
MINERAL INSULATED CABLE CONNECTOR
Joseph C. Norton, Charleston, W. Va., assignor to Union
Carbide Corporation, a corporation of New York
Filed July 5, 1962, Ser. No. 207,651
2 Claims. (Cl. 174—88)

The present invention relates to mineral insulated cable installation and more particularly to a novel method and appaartus for making thermally balanced connections or splices in mineral insulated cable.

A mineral insulated cable, commonly designated MI cable in the electrical arts, comprises one or more electrical conductors imbedded in ultra-dry compressed magnesium oxide powder and encased in a continuous length of soft copper tube or jacket. The magnesium oxide acts as both electrical insulator between the current carrying conductor or conductors and the outer sheath of copper and as a themal conductivity path for electrical heating losses developed in cable operation. Because magnesium oxide is a relatively stable heat transfer medium, mineral insulated cable with copper, or special alloy conductors having higher than normal resistance makes very effective heater cable which has found wide acceptance in industry but not without incidence of application problems. In chemical manufacturing industries, for example, the adaptation of controlled temperature tracing to provide continuous heating media for petrochemical process lines has been found necessary in many processes. The heating media selected must also satisfy safety requirements for use in hazardous and semi-hazardous locations. MI heater cable, while almost ideally satisfying the requirements of such temperature tracing applications, involves the serious problem of maintaining even temperatures at the points of cable splicing and juncture. Conventional MI cable splicing methods which may be satisfactory for conductor electrical continuity are not satisfactory in cases where the splice must also be a heat conductor. In order to realize the optimum benefit to be derived from the use of MI heating cable in precisely controlled electrical temperature tracing systems, splices and joints must be made in a manner to effect equalization of heat transfer properties as between splice locations and straight runs of cable. In other words, the heat transfer rate ideally should be the same at a splice as it is at unspliced portions of the heater cable run.

Present MI heater cable splicing technique comprehends stripping the outer copper sheath or jacket from each of the cable sections to be spliced for a sufficient distance back from the conductor ends to facilitate installation of appropriate conductor connections, breaking away the compressed magnesium oxide insulation for the same distance on each cable section, slipping a copper splicing sleeve having an inside diameter slightly larger than the cable jacket outside diameter over one of the cable sections, installing the conductor connectors, moving the splicing sleeve into position over the connected conductors and welding or otherwise sealing the sleeve to each of the jackets of the joined cable sections. The finished splice thus contains an air-filled cavity which will cause a difference in the $I^2R$ transference or heat dissipation rate at the splice location as compared with the heat dissipation rate along unspliced portions of the MI cable.

In an effort to improve over the simple conventional air-filled splice, a splicing technique involving the same essential steps as outlined above but modified by moving the splice sleeve into position over the connected conductors while simultaneously hand-filling the sleeve as much as possible with powdered magnesium oxide insulation and, when the sleeve is finally in its correct position, welding or otherwise sealing the sleeve to each of the jackets of the joined cable sections has been attempted. This operation, even when performed by a skilled journeyman is a somewhat makeshift method which is quite time consuming and expensive. At best, a finished splice of this type contains uncompacted magnesium oxide and some entrained air, causing a different heat transfer rate or thermal gradient between the conductor or conductors and the outer sheath or jacket by comparison with the heat transfer rates at unspliced portions of the heating cable run, resulting in cable hot spots which, while not quite as serious as those occasioned by air-filled splices, affect operation adversely. While not particularly desirable, hot spots may cause little or no difficulty in MI cable installations where the conductors are used solely as a source of power, but they become very critical in MI cable installations where the conductors are used as a heating medium, particularly in electrical temperature tracing systems adapted to process control work.

It is therefore a primary object of the present invention to provide a mineral insulated cable splicing method and apparatus which will produce a splice having thermal conductivity characteristics closely similar to unspliced sections of cable.

It is a further object of the present invention to provide a mineral insulated cable splice which can be made in the field quickly and without complications.

My invention may be epitomized as a novel splice or joint for connecting an electrical cable comprising an electrical conductor surrounded by compacted finely divided insulation material covering the compacted insulation material and a method for making such a splice or joint, which method comprehends the steps of removing the jacket material and the compacted insulation material from an end of the cable to be connected to expose a preselected length of the conductor, electrically connecting said conductor to a preselected circuit point (such as another conductor), positioning a hollow cylindrical splicing sleeve over said cable and over said circuit point to which said conductor is electrically connected to define a cylindrical space bounded by an inner cylindrical wall portion of said splicing sleeve over said circuit point and an annular space bounded by an other inner cylindrical wall portion of said splicing sleeve over said cable and said jacket material while concurrently filling said cylindrical space with loose finely divided insulation material having, when compacted, thermal conductivity characteristics substantially similar to those of said compacted finely divided insulation material, intruding a hollow cylindrical tamping sleeve (which has been prearranged on the cable) first through the annular space defined by the splicing sleeve and the cable jacket material and ultimately forcibly partially into said cylindrical space to compact the finely divided insulation material therein to a state substantially equal to that of the compacted finely divided insulation material of said electrical cable and sealing said splicing sleeve to the jacket material of the electrical cable.

With the foregoing objectives then in view, as well as others which will hereinafter more fully appear, the invention will now be described in greater detail and with reference to the appended drawings wherein like numerical designations identify similar components in the several figures and wherein.

Figure 1:
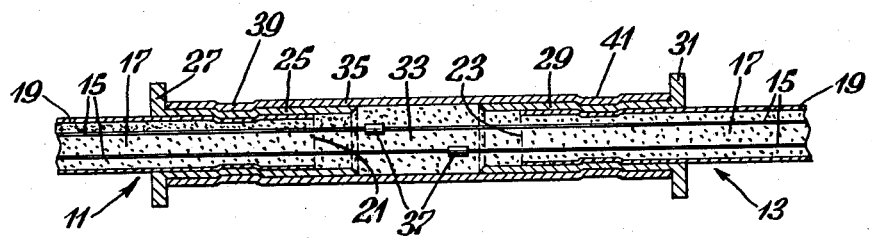
FIGURE 1 is a sectional view through a straight splice of two-conductor mineral insulated cable according to the present invention.

Referring to FIGURE 1 of the drawings, there is shown a first two-conductor mineral insulated cable section 11 spliced to a second similar cable section 13. Each of the cable sections 11 and 13 comprises two conductors 15 imbedded in compressed magnesium oxide powder insulation 17 encased in an outer jacket or sheath 19. The splicing operation is started by stripping the sheath 19 from cable sections 11 and 13 respectively back to the points 21 and 23 and breaking away the insulation 17 back to the same respective points. The exposed conductors 15 are then cut to one long and one short splicing length for each cable section in order to facilitate making the conductor connection arrangement shown in the drawings. At this point in the operation a tamping sleeve 25, generally cylindrical in shape and having a radially extending collar 27 at one end is slipped collar end first over cable section 11. A similar tamping sleeve 29 having a radially extending collar 31 at one end is slipped collar end first over cable section 13. Both tamping sleeves are slid back on their respective cable sections a sufficient distance to permit easy access to a connector zone 33 and to facilitate the remaining steps of the splicing operation. A splicing sleeve 35 is now slipped on over one or the other of the cable sections 11, 13 and move laterally to maintain the access to the connector zone 33.

Let it be assumed that the splicing sleeve is slipped onto cable section 11. Here it should be noted that the inner diameter of the tamping sleeves is selected to effect a slip fit over each cable section outer periphery and the inner diameter of the splicing sleeve 35 is selected to effect a slip fit over the main length periphery of each of the tamping sleeves. The conductors 15 are now connected, the short length extending from cable section 11 to the long length extending from cable section 13 and the long length from cable section 11 to the short length from cable section 13, by any suitable connector devices 37 such as for example crimp type wire connectors. The spliced conductors are now aligned longitudinally as accurately as possible in the connecting zone and the splicing sleeve 35 is slid into position to at least partially enclose the connector zone 33, leaving some space between the splicing sleeve end nearest cable section 13 and that cable section's sheath-insulation cut off point 23. Tamping sleeve 25 is now moved up on cable section 11 and slid part way into the annular space defined between the outer periphery of the cable section 11 sheath 19 and the cylindrical inner wall of the splicing sleeve 35.

Connector zone 33 is now filled with dry magnesium oxide powder insulation similar to that used for insulation 17. The insulation powder is introduced into the connector zone through the space between the splicing sleeve end nearest cable section 13 and the sheath-insulation cut off point 23. As the filling step nears completion, splicing sleeve 35 and tamping sleeve 25 are moved together along cable section 11 towards cable section 13, gradually decreasing the available space for filling, and eventually completely enclosing the connector zone 33. During the filling step gentle hammer tapping on the sleeve 35 may aid in filling all of the interstices of the connector zone with the insulation powder. The splicing sleeve and tamping sleeve 25 are now positioned so that the splicing sleeve is oriented centrally on the splice i.e., covering equal portions of the respective sheaths 19 of the cable sections 11 and 13. With the splicing sleeve properly positioned on the joint, tamping sleeve 29 is moved up on cable section 13 and slid into the annular space defined between the outer periphery of the cable section 13 sheath 19 and the cylindrical inner wall of the splicing sleeve 35. Both tamping sleeves are now inserted as far as possible into the splicing sleeve, first by forcing them in manually and ultimately by hammer tapping the collars at optimum compacting is effected. The action of forcibly intruding the tamping sleeves through the aforedescribed annular spaces and into the connector zone 33 compresses the magnesium oxide powder insulation with which the zone has been filled into a compacted state similar to that of the insulation 17 in unspliced portions of the mineral insulated cable. The joint or splice may be finally sealed against moisture migration by means of a conventional indentor compression tool which is applied at 39 and 41 or a number of similar points on the splicing sleeve 35 to form complete moisture proof peripheral indentations at these points as shown on the drawing. Other methods of sealing the joints will readily suggest themselves to persons familiar with the splicing art.

The result is a fully integrated thermally balanced splice from which wattage in the form of heat will dissipate at substantially the same rate as for straight unspliced runs of MI cable installation.

Figure 2:
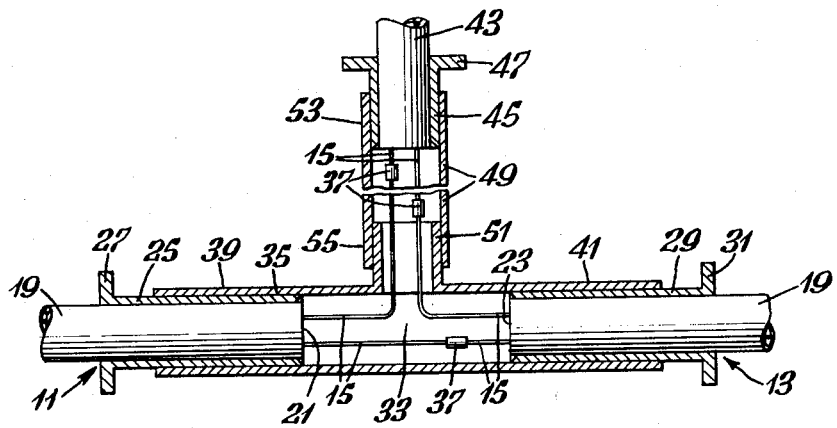
FIGURE 2 is a sectional view through a T splice of two-conductor mineral insulated cable according to the present invention and FIGURE 3 is a sectional view through a modified form of T splice according to the present invention.

The T splice shown in FIGURE 2 of the drawings is made in approximately the same manner as the splice of FIGURE 1. In the FIGURE 2 embodiment, the splicing sleeve 35 is provided with a transversely extending hollow cylindrical neck 51 to accommodate a third tamping sleeve 45 and a second splicing sleeve 49. Tamping sleeve 45 is provided with a collar 47. The splicing operation proceeds in much the same manner as for the straight splice with appropriate variations in the jacket and insulation stripping dimensions and the conductor cutting lengths, as those skilled in the art will appreciate and of course with the added steps respecting the third cable section 43. The filling step need not be performed until the main splicing sleeve 35 is properly oriented in its final position, tamping sleeves 25 and 29 have been partially inserted thereinto and the conductors 15 which are to be connected to the cable section 43 conductors are passed through neck 51 and connected as shown. At this point in the procedure, tamping sleeve 45 and second splicing sleeve 49 are positioned back or up on cable section 43, permitting filling access to the connector zone, at least initially, through the neck 51. Final filling may be accomplished as the second splicing sleeve 49 is gradually worked towards its ultimate position. When the splicing sleeve 49 is finally positioned, tamping sleeve 45 is inserted thereinto and all tamping sleeves are driven up tight to compact the magnesium oxide insulation powder with which the connector zone 33 has been filled. Upon completion of the steps in accordance with the foregoing description the joint is sealed at 39, 41, 53 and 55 in the manner hereinbefore described.

Figure 3:
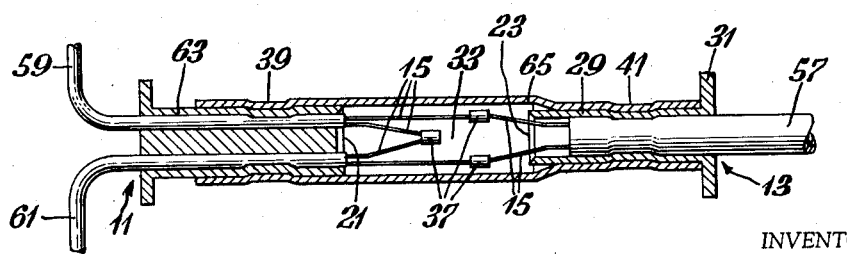

FIGURE 3 of the drawings shows an alternative form of which may be preferred for example where more than one "hot" cable of a heating cable installation is supplied by a "cold" or branch circuit cable, or in some similar circuit application. In FIGURE 3, a mineral insulated circuit cable 57 supplies two divergent cable sections 59 and 61 which are brought out of the splice through a modified tamping sleeve 63. In such splices or joints it may be found advantageous to employ a reduced section splicing sleeve 65. Other portions of the embodiment shown in FIGURE 3 are similar to those in the other figures of the drawings.

The described embodiments, while relating to two-conductor mineral insulated cable are also illustrative and readily interpretable of single conductor and multiconductor (more than two) mineral insulated cable. In the light of my disclosure, it will also be apparent to persons skilled in the art that the splice and splicing techniques of the present invention are readily extendable and useful in dead-ending MI cables and in splicing and dead-ending any electrical cables having jackets other than of copper, brass or the like and having any type of compacted powdered or finely divided electrically insulative material other than magnesium oxide. A dead-ending arrangement is frequently advantageous when it is desired to series-connect the conductors of a two conductor cable at a cable end to form a heater cable section, or when it is desired to connect the conductors of a three phase, three wire, grounded neutral heating circuit to a grounded to cable jacket. In the light of my disclosure, many alternative arrangements within the spirit of the present invention will undoubtedly suggest themselves to persons skilled in the art.

The foregoing description has been given for clearness of understanding only and no unnecessary limitations should be understood therefrom.

What is claimed is:

1. An electrical cable connection comprising, in combination, an electrical conductor surrounded by compacted finely divided electrical insulation material; a jacket material covering said compacted insulation material; said conductor extending for a predetermined length beyond the insulation material and the jacket material into a connection zone; an electrical connector connecting said conductor to a preselected circuit point in said connection zone; a hollow generally cylindrical splicing sleeve over said cable and said connection zone arranged to define said connection zone and an annular space bounded by an inner cylindrical wall portion of said splicing sleeve and a peripheral portion of said jacket material; loose finely divided electrical insulation material in said connection zone substantially completely filling said connection zone, said loose finely divided electrical insulation material having when compacted thermal conductivity characteristics substantially similar to those of said compacted finely divided insulation material; and a hollow cylindrical tamping sleeve arranged in said annular space and extending into said connection zone to an extent sufficient to compact said loose finely divided electrical insulation material to a state substantially equal to that of the compacted finely divided electrical insulation material of said electrical cable.

2. An electrical cable connection according to claim 1 wherein said compacted finely divided electrical insulation material and said loose finely divided insulation material are constituted essentially of magnesium oxide.

References Cited in the file of this patent

FOREIGN PATENTS 461,239     Great Britain _____ Feb. 8, 1937